(12) United States Patent
Kuster et al.

(10) Patent No.: US 11,724,137 B2
(45) Date of Patent: Aug. 15, 2023

(54) FIRE-PROTECTION ROLLING DOOR

(71) Applicant: EFFERTZ TORE GMBH, Mönchengladbach (DE)

(72) Inventors: Felix Kuster, Düsseldorf (DE); Michael Kahle, Mönchengladbach (DE); Claus Schwenzer, Möchengladbach (DE)

(73) Assignee: Effertz Tore GmbH, Mönchengladbach (DE)

( * ) Notice: Subject to any disclaimer, the term of this patent is extended or adjusted under 35 U.S.C. 154(b) by 0 days.

(21) Appl. No.: 17/915,602

(22) PCT Filed: Mar. 30, 2020

(86) PCT No.: PCT/EP2020/058998
§ 371 (c)(1),
(2) Date: Sep. 29, 2022

(87) PCT Pub. No.: WO2021/197571
PCT Pub. Date: Oct. 7, 2021

(65) Prior Publication Data
US 2023/0131519 A1    Apr. 27, 2023

(51) Int. Cl.
*A62C 2/16* (2006.01)
*E06B 5/16* (2006.01)

(52) U.S. Cl.
CPC . *A62C 2/16* (2013.01); *E06B 5/16* (2013.01)

(58) Field of Classification Search
CPC ... E06B 5/16; E06B 5/164; E06B 9/15; A62C 2/16
See application file for complete search history.

(56) References Cited

U.S. PATENT DOCUMENTS

| | | | | |
|---|---|---|---|---|
| 5,419,386 A * | 5/1995 | Magro | | E06B 9/15 |
| | | | | D25/48.8 |
| 8,109,316 B2 * | 2/2012 | Wang | | E06B 9/15 |
| | | | | 160/232 |
| 11,512,523 B2 * | 11/2022 | Dawdy | | E06B 9/17046 |

FOREIGN PATENT DOCUMENTS

| | | |
|---|---|---|
| AT | 355784 B | 3/1980 |
| DE | 2901400 B1 | 6/1980 |
| EP | 0367883 A1 | 5/1990 |

OTHER PUBLICATIONS

International Search Report (English and German) and Written Opinion of the ISA (German) issued in PCT/EP2020/058998, dated Dec. 4, 2020; ISA/EP.

* cited by examiner

*Primary Examiner* — Beth A Stephan
(74) *Attorney, Agent, or Firm* — Harness, Dickey & Pierce, P.L.C.

(57) ABSTRACT

In order to develop a fire-protection rolling door of the type in question such that the fire resistance duration and thermal insulation are improved and increased and in particular heat transfer points extending through the door are avoided, a fire-protection rolling door is proposed which is composed of: —a rolling-door armor of profiled plates which interconnected in an articulated manner; —a sheet-shaped intermediate layer of fire-retardant and thermally insulating material; and—overlapping cover plates, which fire-protection rolling door is held, in the open state, above an opening to be closed in the event of a fire, such that the fire-protection rolling door can be guided in guide rails disposed on both sides, the sheet-shaped intermediate layer having planar carrier segments, which are covered with at least one layer of fire-retardant and thermally insulating material on both sides.

10 Claims, 1 Drawing Sheet

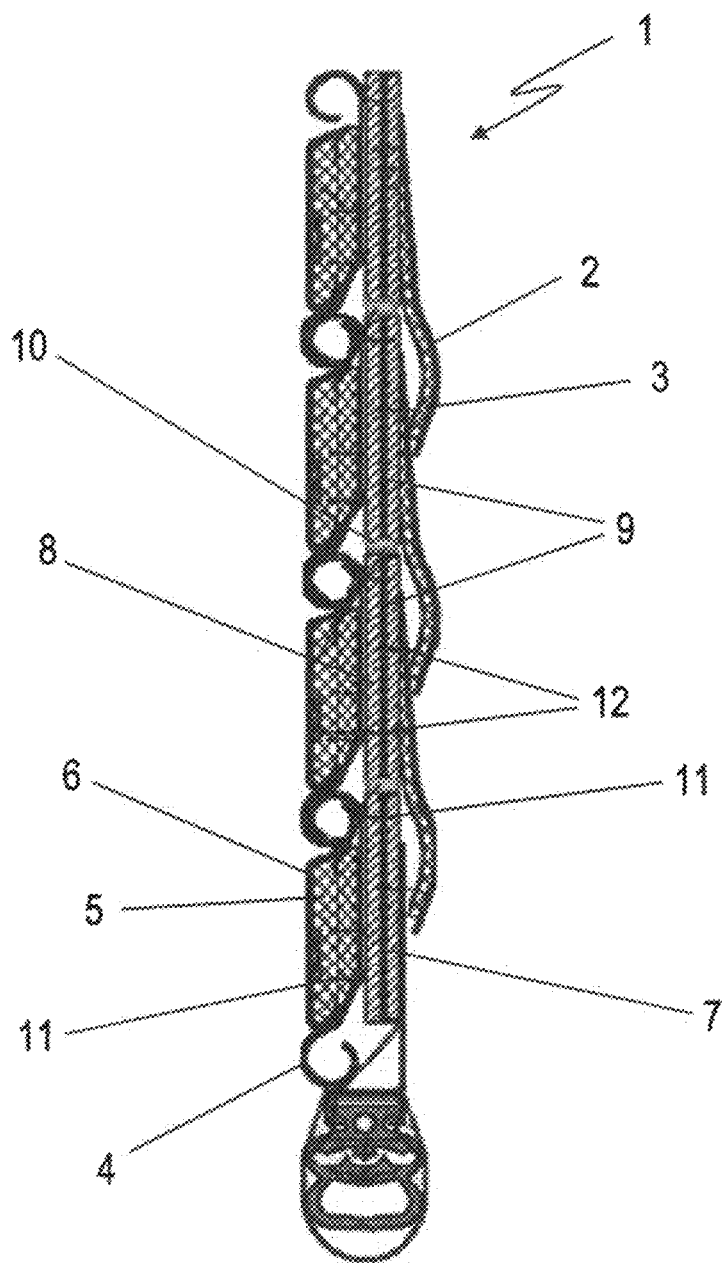

FIRE-PROTECTION ROLLING DOOR

CROSS-REFERENCE TO RELATED APPLICATIONS

This application is a U.S. National Phase application under 35 U.S.C. 371 of International Application No. PCT/EP2020/058998, filed on Mar. 30, 2020. The entire disclosure of the above application is incorporated herein by reference.

FIELD

This disclosure relates to a fire-protection rolling door composed of a rolling door armor of profiled plates which are interconnected in an articulated manner, a sheet-shaped intermediate layer of fire-retardant and thermally insulating material, and overlapping cover plates, which fire-protection rolling door armor is guided in guide rails on both sides and held in the open state above an opening to be closed in the event of fire.

BACKGROUND

This section provides background information related to the present disclosure which is not necessarily prior art.

The fire-protection rolling door of the generic type, known for example from EP 0 367 883 A1, is an airtight and fire-retardant fire-protection rolling door. In this prior art, it is combined with a wicket door. This makes it possible, for example, to allow trucks as well as buses or cars to enter and leave the wagons from the front or rear and to close the wagon after it has been loaded by lowering the fire-protection rolling doors at the front in such a way that, under normal circumstances, people can still leave one wagon through the corresponding wicket doors and cross over to the other or enter the wagon again. In the event of an alarm, the fire protection closure required for safety reasons is provided and at the same time the required air tightness is ensured. In the event of a fire, it is therefore possible to create an airtight room that is fireproofed to the outside by means of the fire-protection rolling doors, into which an extinguishing gas can be introduced. Nowadays, problems arise, for example, in the equipment of ferryman's and cruise ships.

A generic fire-protection rolling door is composed of a rolling door armor of profiled plates which are interconnected in an articulated manner, a sheet-shaped intermediate layer of fire-retardant and thermally insulating material, and overlapping cover plates. Such a door is usually held in guide rails on both sides as well as an under-ceiling guide for holding the rolling door armor horizontally under a wagon ceiling in the open state and is kept hermetically sealed by a sealing device in the closed state. A generic fire-protection rolling door guided in guide rails on both sides and held in the open position above an opening to be closed in the event of fire is rolled up or held horizontally above the opening. Thus, the width is the dimension transverse to the opening to be closed, i.e. the horizontal. This direction corresponds to the specifications of the different widths of the individual components such as cover plates, profile plates, intermediate layers, etc. The width of the components and thus of the rolling door armor is determined, for example, by the horizontal spacing of the guide rails. The open height of an opening to be closed, i.e. the vertical, determines the dimension of the minimum height of the roller door armor and thus the height and number of the individual components such as cover plates, profile plates, etc.

In prior art, it is known that the intermediate layer and the cover plates are attached to the profiled plates. The fastenings for the intermediate layer and the cover plates are designed as hooks, rivets or the like on the profiled plates. This results in the disadvantage that both sides of the fire-protection rolling door are connected by comparatively long and usually metallic elements on a horizontal line in the intended sealing position. This means considerable undesirable heat transfers. In practice, it has been found that weak points develop here in corresponding fire-protection rolling doors and that the fire resistance duration and thermal insulation capacity are limited as a result.

SUMMARY

This section provides a general summary of the disclosure, and is not a comprehensive disclosure of its full scope or all of its features.

Based on the above-described prior art, the object of the present disclosure is the further development of a fire-protection rolling door of the type described above in such a way that the operational safety is improved and increased and, in particular, heat transfers through the door at points are avoided in order to improve the fire resistance duration and the thermal insulation capacity.

According to the disclosure, it is provided that the sheet-shaped intermediate layer has plate-shaped support segments which are each covered on both sides with at least one layer of fire-retardant and thermally insulating material. This insertion of plate-shaped support segments in the intermediate layer now makes it possible to design the fastenings of both the profiled plates and the cover plates independently and variably.

Advantageously, the plate-shaped support segments are designed as metallic support elements. These can be plates or also profiled elements. According to a continuous proposal of the disclosure, the support segments have a U-shaped cross-section. If it is assumed that the support segments extend over the width of the rolling door armor, i.e. the support segments are placed with the longitudinal extent of their edges transversely in the rolling door armor, then an upper and possibly lower edge can be reinforced by a chamfer. If both longitudinal edges are chamfered in the same direction, the result is, for example, a U- or C-shaped cross-section. This can be used to form a receiving space or receiving area for the intermediate layer elements made of fire-retardant and thermally insulating material. In terms of height, the support segments are adapted to the height of the profiled plates, which promotes appropriate roll-up.

In an advantageous manner, the profiled plates can now be connected to the support segments. Pin-type connecting elements such as rivets, screws, bolts and the like can be used for this purpose. The result is an assembly of support segment, intermediate layer element made of fire-retardant and thermally insulating material, and profiled plates.

Furthermore, the cover plates can also be connected to support segments. Pin-type connecting elements such as rivets, screws, bolts and the like can also be used for this purpose. The result is an assembly of support segment, intermediate layer element made of fire-retardant and thermally insulating material and cover plates.

These element groups, referred to as "assemblies", each represent one half of the overall composite consisting of profiled plates, intermediate layer element made of fire-retardant and thermally insulating material, support segment, the further intermediate layer element made of fire-retardant and thermally insulating material and the cover plates. This structure means that the connecting elements to the profiled plates on the one hand and the cover plates on the other hand can now be arranged offset from one another, since there is now a straight connection just from the respective plate to the support segment. In this way, continuous metallic connections are avoided. Offset in the sense of the present disclosure means in any direction, i.e. horizontally, vertically, obliquely or in any suitable manner, in order to avoid a direct through connection through the rolling door armor by contact of connecting elements.

In a further embodiment according to the present disclosure, one or more further support segments with thermally insulating material may be introduced. This results in parallel intermediate layers. This further increases the thermal insulation and the fire resistance duration. The further support segments are connected to another support segment, the profiled plate or the cover plate in the same offset arrangement as described. In these embodiments, too, the profiled plates and the cover plates are always connected only to one or more support elements and in no case directly to each other by means of a continuous connecting element. Thus, central support elements are then connected to each other and the connecting elements are offset accordingly.

Support segments can be provided with seals at their contact edges or at the longitudinal edges adjacent to each other. Elastomers, rubbers and also corded beams impregnated or provided with agents that react to temperatures occurring in the event of fire, for example by foaming, are suitable here. This improves the overall sealing properties of the rolling door armor, for example against smoke gases.

Advantageously, the cover plates can be coated on one or both sides with fire- and heat-insulating material. In particular, the side of the cover plate facing the rolling door armor can be coated with appropriate material. This material can have purely heat-insulating properties or, for example, can foam up in the event of a fire or release corresponding substances and the like as a function of the temperature development, so that in the event of a fire the foaming properties of the material enable increased sealing.

In the same way, the profile plates can be coated with fire- and heat-insulating material. For this purpose, for example, appropriate material can be introduced into box-shaped housings, which are then arranged on the profiled plates.

The intermediate layers of fire-retardant and thermally insulating material can be continuous material webs or, for example, plate-shaped segments. The intermediate layers arranged on both sides of the support segments can be identical or, depending on their functionality, can also be of different design. They can also have purely heat-insulating properties or, for example, foam up in the event of fire or release corresponding substances depending on the temperature development and the like.

The disclosure provides a solidly constructed fire-protection rolling door in which fire safety and efficiency are considerably increased. In particular, the fire resistance duration is significantly increased.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further advantages and features of the disclosure will be apparent from the following description with reference to the drawing figures wherein it is shown by:

FIG. 1 a schematic cross-section through a part of the embodiment of a fire protection rolling door according to the disclosure.

DETAILED DESCRIPTION

Example embodiments will now be described more fully with reference to the accompanying drawing.

The fire-protection rolling door 1 shown in FIG. 1 has cover plates 2 on one side, which in the embodiment shown are coated with fire-retardant and thermally insulating material 3 on the side facing the door.

On the opposite surface, profiled plates 4 are arranged which are hinged to each other to allow rolling or winding. In the embodiment shown, the profiled plates 4 on the side facing away from the door are likewise coated with fire-retardant and thermally insulating material 5, which in the embodiment shown is introduced in each case in a box-shaped housing 6.

Two intermediate layers of fire-retardant and thermally insulating material 7, 8 are arranged in the center. Plate-shaped support elements 9 are positioned between the two. In the embodiment shown, segments are formed in each case which essentially correspond to the height of the profiled plates. Seals 10 are arranged between these segments.

The profiled plates are fastened to the support element 9 by rivets 11. Rivets 12 are used to fasten the cover plates 2 to the support element 9. As can be seen, the rivets 11 and the rivets 12 are offset from each other.

The description of the embodiment serves the purpose of explanation and is not limiting.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

What is claimed is:

1. A fire-protection rolling door composed of a rolling door armor of profiled plates which are interconnected in an articulated manner, a sheet-shaped intermediate layer of fire-retardant and thermally insulating material, and overlapping cover plates, the rolling door armor being guided in guide rails on both sides and held in an open state above an opening to be closed in the event of fire, wherein the sheet-shaped intermediate layer comprises plate-shaped support segments, each of the plate-shaped support segments being covered on both sides thereof with at least one layer of fire-retardant and thermally insulating material, wherein the plate-shaped support segments are connected to the profiled plates by means of first connecting elements and to the cover plates by means of second connecting elements, wherein the first and the second connecting elements are pin-shaped and wherein the first and the second connecting elements are offset from each other.

2. The fire-protection rolling door according to claim 1, wherein the plate-shaped support segments are made of metal.

3. The fire-protection rolling door according to claim 1, wherein the plate-shaped support segments substantially extend over a width of the rolling door armor.

4. The fire-protection rolling door according to claim 1, wherein the plate-shaped support segments include a height based on a height of the profiled plates.

5. The fire-protection rolling door according to claim 1, wherein sealing elements are arranged between the plate-shaped support segments.

6. The fire-protection rolling door according to claim 1, wherein the plate-shaped support segments have a U-shaped cross section.

7. The fire-protection rolling door according to claim 1, wherein the cover plates are covered at least on one side with fire-retardant and thermally insulating material.

8. The fire-protection rolling door according to claim 1, wherein a layer of fire-retardant and thermally insulating material is placed on the profiled plates.

9. The fire-protection rolling door according to claim 8, wherein the layer of fire-retardant and thermally insulating material placed on the profiled plates is arranged in a box-shaped housing.

10. The fire-protection rolling door according to claim 1, wherein several of the plate-shaped support segments which are each covered on both sides with at least one layer of fire-retardant and thermally insulating material are arranged in parallel.

\* \* \* \* \*